Patented Oct. 6, 1953

2,654,766

UNITED STATES PATENT OFFICE 2,654,766

PROCESSES OF REFINING AND PURIFYING FATS AND HIGHER FATTY ACIDS

Ilona Taussky, New York, N. Y.

No Drawing. Application October 2, 1951,
Serial No. 249,395

21 Claims. (Cl. 260—409)

The present invention relates to a process of refining and purifying fats, fatty acids and derivatives thereof.

This application is a continuation-in-part of application Serial No. 717,816, filed December 21, 1946, now abandoned, and entitled "Processes of Refining, Purifying and Hydrogenating Fats, Fatty Acids and Waxes" which is a continuation-in-part of U. S. patent application Serial No. 505,254, filed October 6, 1943, which has matured into Patent No. 2,413,009 entitled "Processes of Refining, Purifying, and Hydrogenating Fats, Fatty Acids and Waxes."

It is an object of the present invention to provide a new process for refining and purifying fats, fatty acids and derivatives thereof by simplified treatment thereof.

It is a further object of the present invention to provide processes for clarification, partial neutralization, removal of oil-soluble metal soaps improving the bleachability of, and hydrogenation of fats, fatty acids and derivatives thereof.

Another object of the present invention is to provide a process for refining and purifying of fats, fatty acids and derivatives thereof which yields very light colored products which contain only traces of impurities.

It is a still further object of the present invention to provide a process of removing metal soaps, i. e. nickel and copper soaps, colloidal metal residues and also iron traces from purified, relatively protein free, fats, fatty acids and derivatives thereof.

With the above objects in view the present invention mainly consists in treating fats, fatty acids and derivatives thereof with a substance adapted to precipitate contained impurities particularly of the protein type and separating the purified products from the sludge containing these impurities.

Freshly rendered fats and fatty acids of vegetable and animal origin including marine oils, sperm oils, glyceride oils, and components of these oils are usually cloudy in appearance because of "fines" i. e. proteinaceous matter. This protein matter, "fines," are still present in emulsion form and are very difficult, in fact almost impossible to precipitate by gravity or centrifugation and cannot be filtered out.

Purification of these substances involves a great number of difficulties and separate operations. The present invention provides a process which may be utilized for the purification of these substances in a simplified operation or a series of simplified operations in the case where an extremely pure product is desired.

Formerly it was necessary in order to purify a fat such as tallow to submit the freshly rendered substance to a series of washing and settling operations to make a partial clarification and filtration possible or complete neutralization was necessary to remove most of the metal soaps.

The present invention provides a process which greatly improves each of these individual purifications and which in fact can be simply used to purify the fat and partially neutralize it all in one operation with less impurities left.

In accordance with the preferred embodiment of the present invention fats are treated with a lignin which has been made water soluble by reaction with an alkali metal compound such as sodium hydroxide or dry sodium phosphate. It is also possible to use an aqueous agent containing lignin and an alkali. In either case it is preferable to use a highly purified lignin such as Rimco 957.

Though the present invention may be carried out in one operation or in a series of operations the substance of the invention is the use of lignin, preferably in highly purified form, along with an alkali, the fat or fatty acid being treated with an aqueous agent containing these substances. The alkali used should be of an alkali metal salt i. e. sodium, potassium, etc. which alkali is preferably first made to react with the lignin so as to make the lignin water soluble, the solution of the lignin and alkali then being made to react with the fat. Preferably 0.1 to 0.5% lignin by weight of the weight of the fat is used.

The mechanism of the operation of the lignin is clear in that the lignin precipitates the protein and some metal salts along with it. A brine solution (20% salt in water) may be used to salt out the lignin which seems to in some way attach itself with the protein and other impurities in the fat. The precipitation of these impurities by the lignin leaves the fat extremely pure and filtrable. The lignin in combination with impurities is then filtered off in any normal manner leaving the purified fat.

Where simple clarification of the fat is desired the lignin-alkali solution is kept at a pH below 7 and preferably at a pH between 5 and 6. Where partial neutralization of the free fatty acids in the fat is desired along with clarification the pH of the lignin-alkali solution is adjusted by the addition of more alkali to be greater than 7.

The lignin used as stated above should be a specially purified lignin such as the lignin sold under the trade name Rimco 957. This lignin has a low ash content, under 0.5%, which ash content can be easily checked as a criterium for purity and constant quality. The acid character (pH 3 to 4) of these lignins permits the addition of alkali up to a desired pH which can be easily controlled according to the effect which should be produced in the various refining steps. The use of these inert qualities of the lignin in the refining and purification of the fats produces extremely unexpected and beneficial results.

If protein or lecithin removal from a vegetable or animal fat is intended in order to clarify a cloudy raw fat, the addition of alkali to the lignin is controlled so as to yield a pH no greater than 7. Preferably the pH is kept between 5 and 6. This is done in order to avoid the formation of fatty acid soaps which will also contaminate the proteins and lecithins. It is of course preferred not to contaminate the proteins and lecithins since the proteins contained in the sludge layer are recoverable by acidification. Lignin being an inert material does not in any way impair the value of the protein when attached to it in some sort of protein-lignin attachment. This is one of the reasons why it is preferable to use a specially purified lignin such as Rimco 957. The proteins may be recovered from the excess water and separated from any entrained oil by acidification with phosphoric acid, monobasic sodium phosphate, citric acid, acetic acid etc. or any mixture of acids or acidic matters.

For partial neutralization of free fatty acids along with clarification of the contaminating proteins and lecithins, the alkalinity of the lignin-alkali solution is adjusted so as to be pH 7 or more. The pH should not be too high so as to avoid an attack on the neutral fat which invariably occurs when the conventional alkali refining procedures are used which employ excess alkali to facilitate separation of oil and soap stock. Lignin oil neutralization inactivates the excess alkali and separates the soap stocks formed from the clear oil by its higher specific gravity.

Lignin is also useful in the hydrogenation of a fat with a nickel catalyst, the lignin having an accelerating effect on hydrogenation with a nickel catalyst and allowing for better separation of nickel traces in the filtered hardened fat due to the inactivation of nickel-soaps which are usually formed in the course of hydrogenation using a nickel catalyst.

Lignin treatment is also useful in improving the bleachability of fats etc., the fats then being bleached to yield a much better bleached product. In this case the fat is treated with an aqueous agent containing an alkali such as sodium hydroxide or sodium phosphate and lignin, the treated fat then being separated from the precipitated impurities by i. e. filtration. This purified fat which requires no washing may then be bleached in any known manner to yield the well bleached fat.

Oil solvent mixture from the extraction of fatty tissues contains "fines" in suspension, i. e. protein particles which float throughout the miscella and give it a cloudy appearance which does not disappear by settling, centrifugation or filtration. The protein particles should be recovered, and if not separated prior to solvent distillation, ruins their feed value to some extent or cause burning i. e. discoloration of the oil and a rise in the content of free fatty acids. It has been found that the addition of clay or filter aids in a filtration step, still left the miscella cloudy and that the greater portion of the "fines" had to be precipitated before any filtration was possible. Lignin made such precipitation possible.

Another impurity found in fat etc. is metal soaps which are oil soluble. By the use of sodium phosphate along with the alkali-lignin solution it has been found that some of the metals are removed. The rest of the metal soaps and iron may then be removed by treatment with monobasic sodium phosphate or phosphoric acid and further or simultaneous treatment with a weak organic acid such as oxalic, citric and/or acetic acid.

The invention may best be understood from the following examples which disclose preferred embodiments of the present invention without, however limiting the scope of the invention to the examples.

*Example I*

Clarification of freshly rendered tallow which is cloudy in appearance because of contained proteinaceous matter may be accomplished as follows:

500 grams animal fat, unsettled, is mechanically stirred and heated to 60° C. with 40 cc. water containing 1.5 grams lignin in the form of Rimco 957, 0.75 gram sodium hydroxide and 1.00 gram trisodium phosphate. To this mixture is added 50 cc. brine (20% salt solution) the mixture is then stirred and heated up to between 75 and 85° C. for 10 to 30 minutes and then allowed to settle for 10 minutes. The resulting fat is clear and filterable.

*Example II*

Another example of clarification of freshly rendered tallow is the following:

500 grams of the same unsettled fat as in Example I is simultaneously stirred and warmed by live, wet steam until it reaches a temperature of about 85° C. This heated fat is then sprayed, without stirring, with a hot water solution containing 5% lignin (Rimco 957), 2% sodium hydroxide and 3% trisodium phosphate until the cloudy oil appearance starts to clear. Hot brine spray follows to complete the initiated clarification. The sludge settles immediately.

In this example after the sludge settles and after removal of the bottom portions, the decanted clear oil may be filtered but is practically clean and moisture free even without filtration.

The proteins contained in the sludge layers of the two examples could be recovered by acidification with phosphoric acid, monobasic sodium phosphate, citric and acetic acid, or preferably a mixture of the acidic matters which breaks the filtrable protein-lignin from the excess water and any entrained oil.

Trisodium phosphate and brine washing of animal fat is not new, but the effect of these ingredients without the addition of lignin is much slower, requires additional water washing and long settling steps which always cause free fatty acid uptake and do not permit protein recovery.

*Example III*

Partial neutralization of fat may be carried out as follows:

500 grams protein-free fat of clear appearance and having FAC color of 23–25 and a free fatty acid content of 11.5% is heated up to 85° C. FAC color refers to standards of color set up by the Fatty Acid Commission, according to the standards of the American Chemical Society and the American Oil Chemical Society, the most desired product having the lowest color.

This heated fat is then sprayed without agitation with 50 cc. of a hot water solution containing 0.75 g. lignin (Rimco 957), 0.50 g. trisodium phosphate and 2.00 g. sodium hydroxide. To this is then added 50 cc. of brine.

The soap stock thus formed settles fast and sharp and the clean, clear oil layer tests 8% residual free fatty acid and a FAC color of 19. This FAC color makes the clean tallow acceptable by the Fatty Acid Commission as a "special tallow," and is without fixed or masked color body and free from soap or alkali traces.

Conventional partial neutralization would cause a breakdown in the oil composition. This is true because a fat containing such high proportion of free fatty acids is unstable due to the free fatty acids autocatalyzing the production of additional free fatty acids from the fat in the presence of impurities. Free fatty acids are liable to reform new free fatty acids from the breakdown of mono- and di-glycerides formed by the alkali attack on the oil structure, also causing glycerin loss. Partial neutralization carried out in the conventional manner is characterized by unseparable flowing soap stock particles which do not settle or wash down. If lignin is used as a soap stock carrier no floating unseparable soap traces remain in the partially neutralized oil.

*Example IV*

Removal of oil soluble metal soaps and iron may be accomplished as follows:

500 grams of substantially protein-free fat from Example I or II above is washed with 150 cc. of water solution containing 0.6 grams sodium phosphate monobasic
0.5 grams phosphoric acid
0.30 grams oxalic acid
0.30 grams citric acid
0.15 grams acetic acid the solution being at about 85° C. This precipitates all of the oil soluble metal soaps and iron which may then be separated by filtration.

If the ash content of a fat is particularly low or if the work is carried out in large size operations (60,000 lbs. per batch) the total amount of the acid mixture is not over 0.1% based on the weight of the oil. The synergistic action of the said combination makes it possible to work with such minute amounts of acids to precipitate the oil soluble impurities without any attack on the oil structure, as does occur when sulfuric or hydrochloric acid would be used for a similar purpose or when e. g. phosphoric acid by itself in sufficient strength would be used. The action of the above "acid wash" is instantaneous and the separation of the acid water is quite sharp without any emulsion layer. The color of the oil is hardly changed after such a wash but the bleachability is now fully established since no oil soluble soaps interfere with the action of a bleaching clay or oxidation bleach.

This acid wash greatly improves the bleachability of the fat.

Dark colored industrial fats having an FAC color 37–45, unbleachable in up to 10% clay or carbon treatments or by oxidation with chlorine dioxide yield an FAC color of 19 when acid washed as above, prior to bleaching. This acid wash by freeing from the fat the oil soluble metal soaps, yields low color readings in the bleaching step which are impossible to obtain otherwise.

Fats which are bleached before a treatment with lignin as in Examples I, II, III or IV do not yield as good a product as fats bleached after treatment with lignin. Raw fats which are bleached with bleaching clay or carbon mixtures, up to 10% of bleaching powder by weight of the weight of the fat, or with chlorine dioxide gas produce at best an FAC color 21.

19 FAC fat obtained from raw fats with an FAC color 23–25 which are treated with lignin as in Examples I, II, III, or IV give an FAC color of 5–7 ("fancy tallow" grade). Furthermore there is a marked deodorization effect on the pretreated and then bleached tallows as against conventionally bleached fats.

It is also possible to improve the bleachability of low protein containing fat by a simplified lignin wash.

*Example V*

450 grams of untreated industrial tallow is heated up to approximately 85° C. To this is added 1.5 g. lignin (Rimco 957) slurried in 10 cc. water which is mixed with 10 cc. of water containing 0.75 g. sodium hydroxide dissolved therein. This is heated for 15 minutes and then left to settle for 15 minutes. The settled fat which requires no washing is treated with 3% special Filtrol and the fat is found to have an FAC color of 1–3.

Industrial tallow, with the color of 19 FAC treated with 3% special Filtrol in a conventional manner by contacting with activated commercial clay and then filtered had an FAC color of 5–7. A comparison of this with lignin treated tallow clearly shows the improvements by the use of lignin.

It is well known that sodium hydroxide can be used to wash out color from a fat which still has loose i. e. unfixed and not burned-in, color particles. However, soap traces left from a conventional hydroxide wash are very difficult to remove, are time and oil wasting, and give cause to foaming and inactivation of bleaching clay as well as filtration difficulties. Therefore a sodium hydroxide treatment prior to clay bleaching cannot be practically applied.

In combination with lignin, the sodium hydroxide has hardly any alkali reaction when used in the indicated proportion, therefore practically preventing the formation of any free fatty acid soaps. Impurities are thus washed out and no after wash is required. Furthermore the settled oils do not foam or froth when reheated and brought into contact with bleaching clay at elevated temperatures. Filtration occurs rapidly and cleanly when the bleaching clay is most efficiently used in the absence of impurities, this being clearly shown by the difference in the lighter color range achieved.

*Example VI*

Miscella oil clarification may be carried out as follows:

400 cc. of tallow miscella containing approximately 15% fat is mixed at about 40–60° C. with 10 cc. of water containing 1.5 g. lignin (Rimco 957), 0.75 g. sodium hydroxide and 0.25 g. lime.

Settling and clarification proceeds immediately and after removal of the sludge portion the clarified product is sprayed with 10 cc. of water containing 0.5 g. citric acid to break any metal soap emulsion.

After the clarification of a miscella the distillation of solvent does not endanger the color of the raw fat and proceeds faster and smoother in the absence of "fines." Of course a partial neutralization of the free fatty acids in the presence of lignin can be effected on the miscella oil and if this is followed with bleaching and filtration using preferably spent clay, in fresh non-oxidized state, the miscella benefits in color without contamination by mineral acid traces contained in new bleaching clay. Light colored oils with a low free fatty acid content and free from customary fixed impurities are formed and subsequent refining steps are greatly facilitated.

Facilitation of neutralization in the presence of lignin is proven by the following test:

(a) 500 grams ricebran oil with a free fatty acid content of 0.53% was mixed with 10 cc. of water containing 0.5 g. sodium hydroxide, agitated and heated to 140° F. and then settled. The topped oil had a free fatty acid content of 0.12%. Refining of this caused a refining loss of 5.8%.

(b) 500 grams ricebran oil mixed with 2.5 grams lignin and 10 cc. of water containing 0.5 gram sodium hydroxide was agitated and heated to 140° F. and then settled. The topped oil has a free fatty acid content of 0.12% but refining caused a refining loss of only 1.4%.

*Example VII*

The use of Rimco also aids in the hydrogenation of oils and other fats. Such hydrogenation may be carried out as follows:

500 grams cottonseed oil, salad oil quality was mixed with 10 grams Rufert nickel catalyst, 2 grams Hyflo Supercel, filter aid and 2 grams lignin (Rimco 957). This cottonseed oil hydrogenated in 30 minutes to an iodine value of 15. It filtered extremely clear and free from hydrogenation odor.

Another sample treated exactly as above however, without the use of lignin and hardened under exactly the same conditions reached an iodine value of 20 in the same reaction. Furthermore it filtered less clear, somewhat colloidal and with a normally noticeable hydrogenation odor.

The removal of metal soaps and iron from fat is greatly facilitated by pre-treatment with lignin but does however still require difficult removal operations. The removal of these impurities is greatly facilitated by the use of and treatment with phosphoric acid and/or sodium phosphate so as to separate the metal soaps and further or simultaneous treatment with at least one organic acid such as oxalic acid, citric acid, or acetic acid which precipitates iron traces.

In accordance with a preferred embodiment, this refining treatment is combined with the step of subjecting the thus treated substance to treatment with a small percentage of at least one organic acid adapted to precipitate traces of iron contained in the substance, and removing thereafter the thus precipitated iron traces.

It has been found also of advantage to subject before the above described treatments the fat, wax or fatty acid to a heat treatment, e. g. by subjecting an intimate mixture of this fat, wax or fatty acid and a small percentage of a finely divided metal catalyst to pressure at an elevated temperature. I preferably mix the fat, wax, or fatty acid to be purified with a small percentage of a spent metal catalyst, e. g. a spent nickel or nickel-copper catalyst, and then subject the thus obtained mixture to hydrogen pressure at temperature above 212° F., preferably at a temperature slightly above 212° F.

It has been found that addition of the spent catalyst in combination with subjecting the mixture to hydrogen pressure at a temperature slightly above 212° F. produces the required bleaching and purifying effects within a surprisingly short time without the necessity of raising the temperature during this process to one which is not advisable in the ordinary steel vessels customarily used. Furthermore, it has been found that this new pretreatment makes it possible to substantially decrease the amount of activated catalyst needed for the consecutive hydrogenation, thereby making hydrogenation of such substances possible which up to now could not be economically hydrogenated because of the high costs caused by the relatively large amounts of catalyst needed therefor.

It is advantageous to use a hydrogen pressure of between 50 and 750 pounds and to agitate the mixture while it is under this pressure and at a temperature of about 220° to 225° F. I have also found it advantageous to add to the mixture before the hydrogen pressure and heat treatment a small percentage of a bleaching agent, e. g. from one percent to five percent of activated earth and about one percent of activated carbon. Addition of these agents substantially decreases the amount of formed nickel or other metal soaps so that removal of these soaps by consecutive treatments will be either entirely unnecessary or substantially facilitated.

Of course, the percentages of the bleaching and purifying ingredients used for the purposes of the present invention might be varied between relatively wide limits depending on the composition and characteristics of the treated materials. Thus, for instance, I have found that best results might be obtained in the process of purifying crude tall oil if the same is mixed with about one percent to five percent of activated earth, about one percent of activated carbon, and about two to five percent of spent metal catalysts, preferably spent nickel or nickel-copper catalysts. I may also add a small percentage, e. g. about one percent, of inactivated kieselguhr particularly of various filtercels, which addition serves as carrier for the impurities during precipitation, thereby facilitating removal of the same. I wish to note that if the spent catalyst used for my process contains already used filter material, no fresh filtercel, kieselguhr or activated carbon have to be added separately.

Of course, for refining and bleaching other fatty acids, the percentages of added agents have to be varied; thus, for instance, I have found that undistilled cotton oil fatty acid and undistilled oleic acid and similar acids may be refined by mixing them with about one percent to two percent of a spent catalyst, about one quarter of a percent to three quarters of a percent of activated earth, about one quarter to three quarters of a percent of filtercel, and about one quarter of a percent of activated carbon, and then treating the thus obtained mixture in the same way as explained above, with the only difference that a hydrogen pressure of not more than 50 pounds has to be applied.

The above described treatment of the undistilled fatty acids, as for instance tall oil, will result in substantial bleaching and refining of the acids; however, the same will still contain the metal soaps formed by the above described treatment with the spent catalyst. These metal soaps, particularly nickel and/or copper soaps, are then removed by a subsequent treatment with diluted phosphoric acid and/or sodium phosphate as described above. If the thus refined products are not to be subjected to hydrogenation, they can then be considered bleached and purified and stable enough to be used for soap making or for drying oil esterification purposes without the disadvantage of color reversion which even occurs when distilled fatty acids are used.

A further effect of subjecting the pretreated fatty acids to a subsequent treatment with phosphoric acid and/or sodium phosphate is the complete removal of the last traces of sulphur impurities which are injurious and inhibit any catalytic reaction to which the refined and purified acids might be subjected, e. g. for hydrogenation purposes. I have found that acids and oils treated in the way described above react much faster during subsequent catalytic reaction and that much less catalyst is needed for such a reaction than if the acids and oils are not subjected to phosphoric acid and/or sodium phosphate treatment.

The thus purified fatty acids still contain iron traces. In accordance with my present invention, the same may be removed by treatment with an organic acid, e. g. by addition of traces, e. g. about 0.01% of acetic, citric or oxalic acid. This refining step might then be followed by bleaching with fuller's earth and activated carbon.

The fatty acids refined as described above may then be subjected to a hydrogenation process. The single process steps of my new hydrogenation process are similar to those customary with the main difference that the amount of activated catalyst, the reaction temperature and the reaction pressure can be substantially reduced; thus, for instance, it is possible to reduce the amount of activated catalyst to about one percent of the refined higher fatty acids. In view of the fact that the cost of this activated live catalyst is the factor which decides the cost of the final hydrogenated product, it is of extreme importance to reduce the amount needed for hydrogenation as far as possible. Since all known hydrogenation processes require several times as much catalyst as the present method, this, my new method, is the first to make hydrogenation of undistilled higher fatty acids, particularly of tall oil, economical and feasible on a commercial scale. It is also possible, as mentioned above, to reduce the reaction temperature and pressure during hydrogenation; thus, very good results can be obtained by hydrogenating at a temperature slightly above 212° F. and under a pressure of 750 pounds or less.

Such hydrogenation of fatty acids, even of neutral glycerides, with the help of metal catalysts leads to the formation of metal soaps as a side reaction. These metal soaps occur in traces or in appreciable amounts according to the free fatty acid content, as even a practically neutral oil is never quite free of fatty acids, at least around 0.1% will be normally encountered. The type of catalyst used and the presence or absence of humidity in the hydrogenation process will promote hydrolysis to a greater or lesser degree and thus account for the amount of metal soaps in the hardened product.

In the case of fatty acid hydrogenation, the presence of metal soaps is readily revealed by a greenish-brownish color, whilst neutral glycerides do not always show the metal soaps to the eye and therefore it is a general practice to assume that a hardened product is sufficiently free from metal compounds if it filters clearly without development of an off-color. It has been observed, however, that such hydrogenated oils lack in color stability and start to discolor shortly after hydrogenation which, as I found, is due to an oxidation process promoted by the presence of metal soaps. These metal soaps cannot be filtered by the customary fuller's earth treatments nor by a caustic soda reneutralization process which usually involves emulsion losses just due to the presence of the metal soaps.

If, however, the metal soaps are properly removed, no discoloration takes place and the induction period as tested by the stability tests according to the recommendations of the American Oil Chemical Society is greatly improved. Even the hydrogenation smell and taste can be reduced or avoided in some cases through elimination of these metal soaps, whilst a caustic soda neutralization treatment after removal of the metal soaps will proceed without losses due to emulsions.

To achieve these results, I submit the hydrogenated products immediately after the hydrogenation process or if this is not possible at a later time to an acid treatment which comprises the use of a combination of phosphoric acid with sodium acid phosphate, followed by citric acid, or acetic acid, or sodium silicate which yields upon application colloidal silicic acid and therefore performs an acid reaction on the metal soaps but removes the free fatty acids of the hydrogenated fats at the same time.

Sulphuric acid as well as hydrochloric acids should be avoided not only for edible fats but also for technical products because there is a danger of side reactions when hardened fats with an elevated melting point are exposed to such strong acids.

In this connection, I wish to mention that an important improvement of my new process consists not only in treating the fatty acids before and after hydrogenation in the way described above and claimed in the following claims, but also in carrying the hydrogenation process out in a certain new way, namely by means of a mixed copper-nickel catalyst consisting preferably of about fifty to eighty percent of nickel and about fifty to twenty percent of copper. According to my observations, this catalyst is particularly effective by combined action of the copper and nickel ingredients, namely, the copper particles of the catalyst absorb those impurities of the fatty acid to be hydrogenated, e. g. of tall oil, which inhibit the catalyst action, and the nickel particles of the catalyst then freely react with the thus purified fatty acid. Some crude tall oils and other undistilled fatty acids will respond to a catalyst of this type even without any pretreatment. Therefore, I wish to stress that use of such a catalyst for hydrogenation purposes, particularly for hydrogenation of undistilled fatty acids and tall oil or the like constitutes in itself an important improvement, independently from any pretreatment described above. Of course, combination of this new catalyst during hydrogenation with my above described new purifying and bleaching pretreatment is particularly advantageous and gives exceptionally good and economical results, since this combined process results not only in very light colored hydrogenated products but also reduces still further the amount of activated catalyst needed for hydrogenation purposes.

The thus hydrogenated fatty acids might still contain some traces of metal soaps, e. g. nickel and copper soaps; they might also contain colloidal nickel and/or copper impurities caused by the hydrogenation treatment; finally, they may also contain traces of iron if they were treated or rendered in iron vessels. To remove these metals and metal soaps, the hydrogenated fatty acids are again subjected to treatment with phosphoric acid and/or sodium phosphate which remove the metal soaps and the colloidal metals and with an organic acid, e. g. acetic, citric or oxalic acid, to remove the iron traces. This latter treatment might then finally be followed by subsequent bleaching with fuller's earth and activated carbon.

I wish to stress that, as stated above, my present invention relates to processes of refining and purifying fats, for instance oils of vegetable origin, cotton seed oil, linseed oil and soybean oil and oils of animal origin, for instance whale oil, tallow, and hog fat; it also relates to refining and purifying of waxes of animal origin as sperm oil, liver oils with a high content of unsaponifiables and mullet oil, of waxes of vegetable origin as jojoba oil, of mineral oils as liquid paraffin, and of mineral waxes as ozokerite, i. e. mixtures of hydrocarbons. My present invention furthermore relates to fatty acids and fatty matters of mixed compositions. Thus, the term "fats, fatty acids and waxes" as used above and in the following claims is intended to cover all substances and materials of the groups listed above.

Of course, also the term "fatty acids" used in the preceding description of my invention is to be understood as broadly as possible and the processes described above might be used also for and in connection with all above mentioned substances and materials.

Thus, for instance, this term is intended to include not only single fatty acids or other substances but also mixtures of such fatty acids and other substances, these mixtures might be purified or unpurified, distilled or undistilled; they might also contain other materials, as for instance, rosin acids or the like.

The following examples are illustrative of my process, although it is to be understood that I do not intend to limit myself particularly thereto:

Example A

Neutralized, clear cocoanut oil is melted, mixed with 0.2% filtercel, 0.1% Raney catalyst and then hydrogenated under 50 pounds pressure p. s. i. at a maximum temperature of 300° F. The oil, practically completely hydrogenated to iodine val. 0.5 is filtered clear from the catalyst by the introduction of more filtercel to precoat the filter press. The warm oil is then mixed with 0.01% phosphoric acid and 0.1% sodium acid phosphate dissolved in warm water and the whole is boiled up with open steam close to the boiling point of water, then settled for a short time. Greenish water can be removed from the bottom of the kettle, after which the oil is sprayed with 1 Bé. hot caustic soda to remove all the free acidity calculated as lauric acid, the oil is washed soap free by hot water sprays and then filtered with 0.1% Hyflosupercel and 0.05% charcoal (Nuchar GFO). The thus treated oil is perfectly water white and stays color stable and free from hydrogenation smell and taste ready for edible use without following steam deodorization.

Example B

Neutralized and bleached soybean oil is mixed with 0.5% Rufert catalyst which has 25% nickel content, rest protection oil, 0.2% Hyflosupercel, 0.05% Nuchar, neutral grade, then submitted to hydrogen under 50 pounds pressure p. s. i. at around 300° F. until shortening consistency or oleo margarine consistency has been achieved with a corresponding iodine value around 60. After careful filtration the oil is boiled up with 1% sodium silicate dissolved in twice its weight of water until a temperature close to water boiling has been reached. The settling yields a granulated soap and colored water at the bottom of the kettle and the rest of the neutralized oil is washed with hot water. Then drying under vacuum follows and ½% of activated bleaching earth, together with 0.01% acetic acid and 0.01% citric acid are added to achieve a stable color of not more than 0.1 red, 2 yellow Lovibond. The fats are cooled before filtration on the filter press, under vacuum, and the filtered fat is then steam-vacuum deodorized and then remains without soybean flavor reversion on a long induction period.

Example C

Crude tall oil is intimately mixed with five percent of activated earth, preferably "Retrol," one percent of filtercel, i. e. inactivated kieselguhr, two percent of spent nickel-copper catalyst, and one percent of activated carbon. After these additions are finally divided in the tall oil, the temperature of this mixture is raised up to 200° F. and then hydrogen is introduced under pressure of about 250 pounds. Thereafter, the temperature of the mixture is further raised until 225° F. and then maintained at this level for about two hours. During this time, the mixture is agitated in order to obtain intimate contact of the oli with all added bleaching and refining agents and with the hydrogen introduced under pressure.

After maintaining hydrogen pressure for about two hours, the temperature of the oil is lowered and the thus treated oil filtered. Thereafter, the clear filtered oil is stirred in an open vessel and about 0.3% of phosphoric acid having a specific gravity of 1.041 and about 0.1% of monobasic sodium phosphate are added, both said substances well dissolved in water; the preheated oil together with these admixtures is then heated up to 200° F. and reacted with the acid and phosphate for at least thirty minutes.

The oil is then settled without stirring for at least thirty minutes and the precipitated greenish nickel and copper soaps are then removed. The thus obtained clear, substantially refined tall oil might then be mixed with about 0.1% of filtercel and filtered.

If the thus cleaned tall oil is to be used as oil without any following hydrogenation, it can be once more treated with fuller's earth and activated carbon. Previous to such treatment, 0.01% of an organic acid like acetic, citric or oxalic acid can be added to remove iron traces; this step will promote the bleaching effect of the subsequent bleaching treatment with fuller's earth and activated carbon.

The preheated tall oil can then be hydrogenated. The process steps are similar to the customary ones; the main difference is that a mixed metal catalyst consisting of two thirds of nickel and one third of cooper is used and that not more than one percent of this catalyst is needed for obtaining excellent hydrogenation results.

Furthermore, the hydrogenation is carried out at about 225° F. under a pressure of 750 pounds or somewhat less.

This hydrogenation treatment might be followed by purification of the hydrogenated oil in order to remove formed metal soaps, e. g. nickel and copper soaps, colloidal nickel and copper, and iron traces. This is obtained by repeated treatment with about 0.5% of phosphoric acid, about 0.2% of sodium phosphate, followed by subsequent treatment with about 0.02% of an organic acid. This latter step might then be followed by subsequent bleaching with fuller's earth and activated carbon.

Example D

Undistilled cotton oil fatty acid is intimately mixed with about one half percent of activated fuller's earth, one quarter of a percent of activated carbon, one half percent of inactivated kieselguhr, and one percent of a spent catalyst, preferably a spent nickel-copper catalyst, consisting of two thirds of nickel and one third of copper. The thus obtained mixture is then treated in the same way as described above in Example C for refining, bleaching and hydrogenation of tall oil with the only difference that the mixture is subjected to a hydrogen pressure of only fifty pounds.

Example E

Undistilled rod oil, i. e. commercial oleic acid, is treated in the same way as described in Example IV for cotton oil fatty acid.

Example F

Undistilled crude tall oil is hydrogenated without any pretreatment with a mixed nickel-copper catalyst consisting of two thirds of nickel and one third of copper. The hydrogenation steps themselves are identical with those of other customary hydrogenation treatments. The only difference is that by use of the above described new catalyst good hydrogenation results might be obtained also without any purifying pretreatment in case of certain types of crude tall oil while customary catalysts will not have any hydrogenation effects without pretreatment of the crude oil.

Example G

Crude cottonseed oil, dark colored and still containing its original free fatty acid content is intimately mixed with two percent of spent nickel-copper catalyst and 1% of filtercel, inactivated kieselguhr. The temperature of this mixture is raised up to 200° F. and then hydrogen is introduced under pressure of about 250 lbs. This temperature is maintained for about two hours. During this time, the mixture is agitated in order to obtain intimate contact of the oil and its refining reagents and with the hydrogen kept under pressure. The temperature of the mixture is then lowered to about 180° F., the pressure released and the thus treated oil filtered.

The oil is now only caustic refined in the customary way which gives the advantage that the foots thus obtained are much cleaner and more valuable. Less caustic washes are required to obtain a clear, neutral oil which results in decreased refining losses. The neutral oil is refiltered with filtercel and unactivated fuller's earth to remove the last traces of soap.

If the thus cleaned cottonseed oil is to be used as liquid oil, it can be treated once more with activated earth and carbons. Previous to such treatment, 0.01% of an organic acid like acetic or citric (not oxalic because it is toxic for edible oil purposes) can be added to remove iron traces; this step will promote the bleaching effect of the subsequent treatment with activated earth and carbons. The pretreated oil has better keeping qualities and can be deodorized in the regular way but under savings of steam.

The pretreated cottonseed oil can also be hydrogenated. The process steps are similar to the customary ones; the main difference is that a mixed metal catalyst consisting of ⅔ of nickel and ⅓ of copper is used and that a small percentage of the catalyst can be roused much more often. Furthermore, the hydrogenation is carried out at about 225° F. under a pressure of 250 lbs. or somewhat less.

This hydrogenation treatment might be followed by purification of the hydrogenated cottonseed oil in order to remove formed metal soaps, e. g. nickel and copper soaps, colloidal nickel and copper and iron traces. This is obtained by a treatment of 0.3% of phosphoric acid having a specific gravity of 1.041 and about 0.1% of monobasic sodium phosphate which are both well dissolved in water and added to the hydrogenated, filtered cottonseed oil. The hydrogenated oil together with these admixtures is then kept under intimate stirring for at least 30 minutes; the temperature is maintained around 180° F. but not less than 150° F. The oil is then settled without stirring for at least 30 minutes and the precipitated greenish nickel and copper soaps are then removed. The thus obtained clear hydrogenated cottonseed oil is mixed with about 0.1% of filtercel and filtered. The oil is then submitted to a short steam deodorization under vacuum. Citric acid to remove iron traces (0.01%) can be added in this step. The deodorized oil is ready for a first-class shortening with excellent stability and a high smoke point.

Example H

Crude, dark tallow, high in free fatty acid is intimately mixed with ½% spent catalyst and ¼% of filtercel, ¼% activated earth. The temperature of this mixture is raised to 200° F. and then hydrogen is introduced and kept at a pressure of 50 lbs. This temperature is maintained for about two hours. During this time, the mixture is agitated in order to obtain intimate contact of the oil and its refining reagents and with the hydrogen kept under pressure. The temperature of the mixture is then lowered to about 180° F., the pressure released and the thus treated oil filtered.

The oil can be now caustic refined, totally or partially, in the customary way. The neutralized tallow is refiltered with less than ¼% of neutral earth to remove the last traces of soap in case a hydrogenation treatment follows for the purpose of saturation of the double bonds and increase of melting point and titer.

If the thus cleaned tallow is to be used as such without subsequent hydrogenation it can be treated once more with activated earth and carbons. Previous to such treatment, 0.01% of an organic acid like acetic or citric (not oxalic, because it is toxic for edible oil purposes) can be added to remove iron traces; this step will promote the bleaching effect of the subsequent treatment with activated earth and carbons. The purified tallow has better keeping qualities of color and odor and can be used for high class white, perfumed toilet preparations.

The pretreated tallow can also be hydrogenated. The process steps are similar to the customary ones; the main difference is that a mixed metal catalyst consisting of ⅔ of nickel and ⅓ of copper is used and that a small percentage of the catalyst can be roused much more often. Furthermore, the hydrogenation is carried out at about 225° F. under a pressure of 250 lbs. or somewhat less.

This hydrogenation treatment might be followed by purification of the hydrogenated tallow in order to remove formed metal soaps, e. g. nickel and copper soaps, colloidal nickel and copper and iron traces. This is obtained by a treatment of 0.3% of phosphoric acid having a specific gravity of 1.041 and about 0.1% of monobasic sodium phosphate which are both well dissolved in water and added to the hydrogenated, filtered cottonseed oil. The hydrogenated oil together with these admixtures is then kept under intimate stirring for at least 30 minutes; the temperature is maintained around 180° F. (not less than 150° F.). The oil is then settled without stirring for at least 30 minutes and the precipitated greenish nickel and copper soaps are then removed. The thus obtained clear hydrogenated cottonseed oil is mixed with about 0.1% of filtercel and filtered.

*Example I*

Crude jojoba oil is intimately mixed with ½% spent catalyst, ¼% of filtercel, ¼% of carbon. The temperature of the mixture being raised to 200° F. and then hydrogen is introduced and kept at a pressure of 50 lbs. This temperature is maintained for about two hours. During this time the mixture is agitated in order to obtain intimate contact of the oil and its refining reagents and with the hydrogen kept under pressure. The temperature of the mixture is then lowered to about 180° F. and the pressure released and the thus treated oil filtered. Thereafter, the clear filtered oil is stirred in an open vessel and about 0.3% of phosphoric acid having a specific gravity of 1.041 are added, both said substances well dissolved in water; the pretreated oil together with these admixtures is then heated up to 200° F. and reacted with the acid and phosphate for at least 30 minutes. The oil is then settled without stirring for at least 30 minutes and the precipitated greenish nickel or nickel-copper soaps are then removed. The thus clear and substantially refined jojoba oil might then be mixed with about 0.1% filtercel and filtered. The filtercakes of spent catalyst and filtercel from these two filtration steps cannot be reused again.

The pretreated oil is already light in color and does not require any further purifying step for the majority of cases where it might be used in the liquid form. The pretreated jojoba oil can also be hydrogenated. The process steps are similar to the customary ones; the main difference is that a mixed metal catalyst consisting of ⅔ of nickel and ⅓ of copper is used and that a small percentage of the catalyst can be used for even a complete saturation. Furthermore, the hydrogenation is carried out at about 225° F. under a pressure of 250 lbs. or somewhat less.

For the majority of purposes the thus treated and filtered oil will not require any further washing, bleaching or deodorization treatments. The combined pretreatment with spent catalyst and the hydrogenation with nickel copper catalyst yield a color and odor free hard jojoba oil without any further treatment which presents itself as a spermacetic-like crystalline wax.

*Example J*

Crude dark mineral oil is intimately mixed with 5% of activated earth, preferably "Retrol," one percent of filtercel, two percent of spent nickel or nickel-copper catalyst and one percent of activated carbon. After these additions are finely divided in the oil, the temperature of the mixture is raised up to 180° F. and hydrogen is introduced under pressure of about 750 lbs. The temperature of the mixture is kept under 200° F. for about 2 hours. During this time, the mixture is agitated in order to obtain intimate contact of the viscous mineral oil with all added bleaching and refining agents and with the hydrogen introduced under pressure. The thus treated oil is then filtered. The clear filtered oil is stirred in an open vessel and about 0.3% of phosphoric acid having a specific gravity of 1.041 and about 0.1% of monobasic sodium phosphate are added, both said substances well dissolved in water; the pretreated oil together with these admixtures is then heated up to 200° F. and reacted with the acid and phosphate for at least 30 minutes. The mineral oil is settled without stirring for about 30 minutes and the precipitated greenish metal soaps are then removed. The thus obtained clear oil is greatly improved in color and odor and a test will show a sharp decrease in sulphur compounds. The oil is filtered with a small percentage of filtercel and then rebleached with fuller's earth and activated carbon. Previous to such treatment, 0.01% of an organic acid, like acetic, citric and/or oxalic can be added to remove iron traces; this step will promote the bleaching effect of the subsequent bleaching treatment with fuller's earth and activated carbon.

It will be understood that each of the elements described above, or two or more together, may also find a useful application in other types of purification and refining steps differing from the types described above.

While the invention has been illustrated and described as embodied in purification and refining of fats, fatty acids and derivatives thereof, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. Process of purifying and refining fats, and higher fatty acids, comprising the steps of treating a substance selected from the group consisting of fats, and higher fatty acids with at least one alkali metal derivative of a lignin so as to cause precipitation of the impurities contained in said treated substance; and separating the purified product from the precipitated impurities.

2. Process of purifying and refining fats, and higher fatty acids, comprising the steps of mixing a substance selected from the group consisting of fats, and higher fatty acids with at least one alkali metal derivative of a lignin so as to cause precipitation of impuirties contained in said treated substance; stirring said mixture; heating said mixture while stirring; allowing said stirred hot mixture to stand so as to settle; and separating the clear oil from the sludge in said settled mixture.

3. Process of purifying and refining fats, and higher fatty acids, comprising the steps of mixing a substance selected from the group consisting of fats, and higher fatty acids with at least one alkali metal derivative of a lignin so as to cause precipitation of impurities contained in said treated substance; stirring said mixture; heating said mixture while stirring; allowing said stirred hot mixture to stand so as to settle; and filtering the settled mixture so as to separate the clear oil from the sludge.

4. Process of purifying and refining fats, and higher fatty acids, comprising the steps of mixing a substance selected from the group consisting of fats, and higher fatty acids with an aqueous agent containing lignin and sodium phosphate so as to form a sodium lignin which acts on said substance to cause precipitation of impurities contained in said treated substance; stirring said mixture; heating said mixture while stirring; allowing said stirred hot mixture to stand so as to settle; and separating the clear oil from the sludge in said settled mixture.

5. Process of purifying and refining fats, and higher fatty acids, comprising the steps of treating a substance selected from the group consisting of fats, and higher fatty acids with an aqueous agent containing lignin and at least one alkali metal compound so as to cause precipitation of the impurities contained in said treated substance; and separating the purified product from the precipitated impurities.

6. Process of purifying and refining fats, and higher fatty acids, comprising the steps of treating a substance selected from the group consisting of fats, and higher fatty acids with an aqueous agent containing 0.1 to 0.5% by weight of the weight of the substance being treated of lignin and at least one alkali metal compound so as to cause precipitation of the impurities contained in said treated substance; and separating the purified product from the precipitated impurities.

7. Process of purifying and refining fats, and higher fatty acids, comprising the steps of treating a substance selected from the group consisting of fats, and higher fatty acids with a hot water solution containing lignin and at least one alkali metal compound, said alkali metal compound and said lignin forming in solution an alkali metal lignin which causes precipitation of the impurities contained in said treated substance; and separating the purified product from the precipitated impurities.

8. Process of purifying and refining fats, and higher fatty acids, comprising the steps of treating a substance selected from the group consisting of fats, and higher fatty acids with a hot water solution at a temperature above 60° C. containing lignin and at least one alkali metal compound, said alkali metal compound and said lignin forming in solution an alkali metal lignin which causes precipitation of the impurities contained in said treated substance; and separating the purified product from the precipitated impurities.

9. Process of purifying and refining fats, and higher fatty acids, comprising the steps of mixing a substance selected from the group consisting of fats, and higher fatty acids with a hot aqueous agent containing lignin and at least one alkali metal compound so as to cause precipitation of the impurities contained in said treated substance; stirring said mixture; heating said mixture above 75° C. while stirring; allowing said stirred hot mixture to stand so as to settle; and separating the clear oil from the sludge in said settled mixture.

10. Process of purifying and refining fats, and higher fatty acids, comprising the steps of mixing a substance selected from the group consisting of fats, and higher fatty acids with a hot aqueous agent containing lignin and at least one alkali metal compound so as to cause precipitation of the impurities contained in said treated substance; stirring said mixture; heating said mixture above 75° C. for 10 to 30 minutes while stirring; allowing said stirred hot mixture to stand so as to settle; and separating the clear oil from the sludge in said settled mixture.

11. In a process of purifying and refining fats, and higher fatty acids, the steps of clarification comprising mixing a substance selected from the group consisting of fats, and higher fatty acids with an aqueous agent containing lignin and at least one alkali metal compound and being at a pH below 7 adapted to cause precipitation of the protein impurities contained in said treated substance; adding a brine solution to said mixture; and separating the clarified substance from the protein-containing impurities.

12. In a process of purifying and refining fats, and higher fatty acids, the steps of clarification comprising mixing a substance selected from the group consisting of fats, and higher fatty acids with an aqueous agent containing lignin and at least one alkali metal compound and being at a pH between 5 and 6 adapted to cause precipitation of the protein impurities contained in said treated substance; adding a brine solution to said mixture; and separating the clarified substance from the protein-containing impurities.

13. In a process of purifying and refining fats, and higher fatty acids, the steps of clarification comprising mixing a substance selected from the group consisting of fats, and higher fatty acids with an aqueous agent containing about 0.1 to 0.5% by weight of the weight of the substance being treated of lignin and at least one alkali metal compound and being at a pH below 7 adapted to cause precipitation of the protein impurities contained in said treated substance; adding a brine solution to said mixture; and separating the clarified substance from the protein-containing impurities.

14. In a process of purifying and refining fats, and higher fatty acids, the steps of clarification and partial neutralization, comprising mixing a substance selected from the group consisting of fats, and higher fatty acids with an aqueous agent containing lignin and at least one alkali metal compound and being at a pH above 7 adapted to cause precipitation of the protein impurities contained in said treated substance and to cause partial neutralization thereof; adding a brine solution to said mixture; and separating the clarified, partially neutralized substance from the protein-containing impurities.

15. In a process of purifying and refining fats, and higher fatty acids, the steps of clarification and partial neutralization, comprising mixing a substance selected from the group consisting of fats, and higher fatty acids with an aqueous agent containing about 0.1 to 0.5% by weight of the weight of the substance being treated of lignin and at least one alkali metal compound and being at a pH above 7 adapted to cause precipitation of the protein impurities contained in said treated substance and to cause partial neutralization thereof; adding a brine solution to said mixture; and separating the clarified, partially neutralized substance from the protein-containing impurities.

16. In a process of purifying and refining fats, and higher fatty acids, the steps of clarification and bleaching comprising mixing a substance selected from the group consisting of fats, and higher fatty acids with an aqueous agent containing lignin and at least one alkali metal compound and being at a pH below 7 adapted to cause precipitation of the protein impurities contained in said treated substance; adding a brine solution to said mixture; separating the clarified substance from the protein-containing impurities; treating said clarified substantially protein-free product with at least one bleaching agent at elevated temperatures; and filtering said treated product so as to remove the bleaching clay thereby obtaining a pure, clarified, bleached product.

17. In a process of purifying and refining fats, and higher fatty acids the steps of miscella oil clarification comprising mixing a miscella derived from a substance selected from the group consisting of fats, and higher fatty acids with an aqueous agent containing lignin, at least one alkali metal compound and lime and being at a pH below 7 so as to cause precipitation of protein particles contained in said miscella; and separating the clarified product from the precipitated protein-containing impurities.

18. Process of purifying and refining fats, and higher fatty acids, comprising the steps of mixing a substance selected from the group consisting of fats, and higher fatty acids with an aqueous agent containing lignin and sodium phosphate so as to cause precipitation of impurities contained in said treated substance; stirring said mixture; heating said mixture while stirring; allowing said stirred hot mixture to stand so as to settle; separating the clear oil from the sludge in said settled mixture; subjecting the thus treated substance to treatment with a small percentage of at least one organic acid selected from the group consisting of oxalic acid, citric acid and acetic acid so as to precipitate the traces of iron contained in said substance; and removing the thus precipitated traces of iron thereby recovering a product substantially free of metal soaps and iron.

19. In a process of purifying and refining fats, and higher fatty acids, the steps of hydrogenation comprising mixing a substance selected from the group consisting of fats, and higher fatty acids with a nickel catalyst and lignin; treating said mixture with hydrogen so as to hydrogenate the substance being treated; and filtering said mixture so as to separate the hydrogenated substance from nickel and lignin thereby obtaining a clear highly hydrogenated product.

20. Process of purifying and refining fats, and higher fatty acids, comprising the steps of mixing a substance selected from the group consisting of fats, and higher fatty acids with an aqueous agent containing at least one water-soluble alkali metal compound and a lignin which react in the water to form a soluble alkali metal lignin, said alkali metal lignin causing precipitation of impurities from said substance; stirring said mixture; heating said mixture while stirring; allowing said stirred hot mixture to stand so as to settle; and separating the clear oil from the sludge in said settled mixture.

21. Process of purifying and refining fats, and higher fatty acids, comprising the steps of mixing a substance selected from the group consisting of fats, and higher fatty acids with an aqueous agent containing at least one water-soluble alkali metal compound selected from the group consisting of sodium hydroxide and sodium phosphate and a lignin which react in the water to form a soluble alkali metal lignin, said alkali metal lignin causing precipitation of impurities from said substance; stirring said mixture; heating said mixture while stirring; allowing said stirred hot mixture to stand so as to settle; and separating the clear oil from the sludge in said settled mixture.

ILONA TAUSSKY.

References Cited in the file of this patent

UNITED STATES PATENTS

| Number | Name | Date |
| --- | --- | --- |
| 1,964,875 | Freiburg | July 3, 1934 |
| 1,973,790 | Appleton | Sept. 18, 1934 |
| 2,249,701 | Clayton | July 15, 1941 |
| 2,269,243 | Baxter et al. | Jan. 6, 1942 |
| 2,336,472 | Dressler et al. | Dec. 14, 1943 |
| 2,355,180 | Remy | Aug. 8, 1944 |

OTHER REFERENCES

"Meadol," an Alkali Soda Lignin (1949), Pamphlet published by The Mead Corporation, Research and Development Department, Chillicothe, Ohio.